United States Patent
Wolf (10) Patent No.: US 10,272,753 B1
(45) Date of Patent: Apr. 30, 2019

(54) SLIDING PANEL ASSEMBLY

(71) Applicant: Philipp J. Wolf, Santa Clara, CA (US)

(72) Inventor: Philipp J. Wolf, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 15/411,064

(22) Filed: Jan. 20, 2017

Related U.S. Application Data (60) Provisional application No. 62/281,057, filed on Jan. 20, 2016.

(51) Int. Cl.
*B60J 10/12* (2006.01)
*B60J 7/043* (2006.01)
*B60J 7/057* (2006.01)

(52) U.S. Cl.
CPC ........... *B60J 7/0435* (2013.01); *B60J 7/0573* (2013.01)

(58) Field of Classification Search
CPC .............................. B60J 7/0435; B60J 7/0573
See application file for complete search history.

(56) References Cited

U.S. PATENT DOCUMENTS

| | | | | |
|---|---|---|---|---|
| 2,124,922 A * | 7/1938 | Lee | ............................. | B60J 1/14 49/144 |
| 2,772,917 A | 12/1956 | Goldman | | |
| 3,591,992 A * | 7/1971 | Pawlicki | .................. | A01G 9/20 52/204.591 |
| 3,994,525 A | 11/1976 | Breitschwerdt et al. | | |
| 4,422,687 A * | 12/1983 | Kaltz | ..................... | B60J 7/0573 296/221 |
| 4,695,090 A | 9/1987 | Draper | | |
| 4,730,868 A * | 3/1988 | Niwa | ...................... | B60J 7/0435 296/216.03 |
| 4,821,394 A | 4/1989 | Martinez-Vera | | |
| 5,156,455 A * | 10/1992 | Kuo | ......................... | B60Q 1/56 362/497 |
| 8,167,253 B2 * | 5/2012 | Smith | .................... | A47B 81/06 108/180 |
| RE46,149 E * | 9/2016 | Gruss | ..................... | B60J 7/0435 |
| 2003/0041536 A1 * | 3/2003 | Tortorella, Jr. | ........... | E06B 3/20 52/204.1 |
| 2004/0201337 A1 * | 10/2004 | Wuestefeld | ......... | A47L 15/4265 312/311 |
| 2008/0001438 A1 * | 1/2008 | Zentgraf | ................. | B60J 7/106 296/210 |

(Continued)

FOREIGN PATENT DOCUMENTS

| | | |
|---|---|---|
| DE | 1630940 A1 | 7/1971 |
| DE | 10228410 A1 | 1/2004 |

(Continued)

*Primary Examiner* — Lori L Lyjak
(74) *Attorney, Agent, or Firm* — Young Basile Hanlon & MacFarlane, P.C.

(57) ABSTRACT

A vehicle includes a windshield, an opening that is located rearward of the windshield, and a sliding panel. The sliding panel has a panel portion and a frame portion, and the frame portion is connected to the panel portion. The sliding panel obstructs the opening in a closed position and is moveable to an open position in which at least part of the opening is unobstructed. The sliding panel is at least one of translucent or transparent. The frame portion does not block visibility through the sliding panel adjacent to a front transverse edge of the panel portion.

17 Claims, 7 Drawing Sheets

(56) References Cited

U.S. PATENT DOCUMENTS

| | | | | |
|---|---|---|---|---|
| 2011/0272974 A1* | 11/2011 | Labrot | ............... | B32B 17/10036 |
| | | | | 296/215 |
| 2012/0169091 A1* | 7/2012 | Renaudin | ............... | B60J 7/0435 |
| | | | | 296/216.03 |
| 2013/0119647 A1* | 5/2013 | Tanaka | ............... | B62D 25/04 |
| | | | | 280/730.1 |
| 2014/0292019 A1* | 10/2014 | Ugolini | ............... | B60J 7/146 |
| | | | | 296/107.07 |
| 2015/0061477 A1* | 3/2015 | Wilson | ............... | H04B 1/3888 |
| | | | | 312/223.1 |
| 2015/0104606 A1* | 4/2015 | Ray | ............... | E04C 2/28 |
| | | | | 428/116 |
| 2016/0031301 A1* | 2/2016 | Nellen | ............... | B60J 7/024 |
| | | | | 296/216.03 |
| 2016/0049980 A1* | 2/2016 | Kim | ............... | H04B 1/3888 |
| | | | | 455/575.8 |
| 2017/0225550 A1* | 8/2017 | Janssen | ............... | B60J 7/047 |
| 2017/0269599 A1* | 9/2017 | Ansari | ............... | G05D 1/0212 |

FOREIGN PATENT DOCUMENTS

| | | | |
|---|---|---|---|
| JP | H0710913 | Y2 | 3/1995 |
| JP | H0724274 | Y2 | 6/1995 |

\* cited by examiner

SLIDING PANEL ASSEMBLY

CROSS-REFERENCE TO RELATED APPLICATIONS

This application claims the benefit of U.S. Provisional Application No. 62/281,057, filed on Jan. 20, 2016, the content of which is hereby incorporated by reference in its entirety for all purposes.

TECHNICAL FIELD

The application relates generally to sliding panel assemblies for vehicle roofs.

BACKGROUND

Automobile windows function in part to admit light into the interior of a vehicle. Some automobile windows, such windows incorporated in automobile doors, are movable to an open position to admit air into the interior of the vehicle. In order to admit additional light and air into the interior, some fixed-roof automobiles include a movable panel known as a sunroof. Sunroofs come in many styles, with the most popular styles incorporating a sliding mechanism that moves a sunroof panel rearward out of a sunroof opening, either to a compartment internal to the roof of the vehicle or to a position external to the roof of the vehicle.

SUMMARY

One aspect of the disclosure is a vehicle that includes a windshield, an opening that is located rearward of the windshield, and a sliding panel. The sliding panel has a panel portion and a frame portion, and the frame portion is connected to the panel portion. The sliding panel obstructs the opening in a closed position and is moveable to an open position in which at least part of the opening is unobstructed. The sliding panel is at least one of translucent or transparent. The frame portion does not block visibility through the sliding panel adjacent to a front transverse edge of the panel portion.

Another aspect of the disclosure is a vehicle that includes a windshield, an opening that is located rearward of the windshield, a translucent panel that has a front transverse edge, and an extension assembly that is connected to the translucent panel for moving the translucent panel between a closed position and an open position. The front transverse edge of the translucent panel is located adjacent to the windshield in the closed position.

Another aspect of the disclosure is a vehicle that includes a first side window, a second side window, an opening that extends from the first side window to the second side window, and a sliding panel that obstructs the opening in a closed position and is moveable to an open position in which at least part of the opening is unobstructed. The sliding panel is formed from a material that is at least one of translucent or transparent.

BRIEF DESCRIPTION OF THE DRAWINGS

The description herein will be made with reference to the following drawings.

DETAILED DESCRIPTION

The following disclosure relates to sliding panel assemblies for automobiles, which may also be referred to as sunroofs. By maintaining transparency or translucency of the panel at a front transverse edge of the sliding panel, such as by not including a frame portion at the front transverse edge of the sliding panel, or by forming the frame portion from a transparent or translucent material, the amount of air and light that may be admitted through the opening is increased. The amount of light and air that may be admitted through the opening can be further increased by incorporating an opening in the roof of a vehicle that extends from a first side window of the vehicle to a second side window of the vehicle, and a sliding panel that is moveable between a closed position and an open position with respect to the opening.

FIGS. 1-4 show a portion of a vehicle 100. The illustrated portion of the vehicle 100 is sometimes referred to as the greenhouse of the vehicle 100, and may include A-pillars 102, a B-pillars 104, C-pillars 106, a front header 108, a fixed roof panel 110, and windows such as a first side window 112, a second side window 114, a windshield 116, and a rear window 118. These portions of the vehicle 100 are described to provide context, and it should be understood that the structures described herein can be implemented in vehicles that are configured differently than the vehicle 100, such as vehicles that lack B-pillars, or in vehicles that include D-pillars.

In the illustrated example, the A-pillars 102 are the forward structural pillars of the vehicle 100 and are adjacent to the windshield 116, the B-pillars 104 are the middle structural pillars of the vehicle 100, and the C-pillars 106 are the rearmost structural pillars of the vehicle 100. The A-pillars 102, the B-pillars 104, and the C-pillars 106 each extend upward from a body structure 120 of the vehicle 100, which may include conventional elements such as fenders, doors, quarter panels, etc. The front header 108 is positioned at an upper end of the A-pillars 102 and extends in a transverse or cross-car direction between the A-pillars 102.

In some implementations, the front header 108 is omitted. In some implementations, the front header 108 is positioned under the windshield 116. The fixed roof panel 110 may be positioned at the upper ends of the B-pillars 104 and the C-pillars 106 and may extend in the transverse or cross-car direction between the B-pillars 104 and between the C-pillars 106.

The A-pillars 102, the B-pillars 104, the C-pillars 106, the front header 108, and the fixed roof panel 110 may be formed from materials such as steel, aluminum, carbon fiber reinforced plastic, other materials known to be suitable for use in vehicle body or frame structures, and combinations of such materials. In addition, the fixed roof panel 110 may be formed in whole or in part from a transparent material such as glass or plastic. The A-pillars 102, the B-pillars 104, the C-pillars 106, and the front header 108 may be partially exposed to the exterior of the vehicle 100 or may be internal structures of the vehicle 100 with other structures service as exterior surfaces of the vehicle 100. At least part of the fixed roof panel 110 is exposed to the exterior and serves as an exterior surface of the vehicle 100.

The first side window 112 and the second side window 114 are positioned on opposite sides of the vehicle 100, may extend rearward from the A-pillars 102 to the B-pillars 104, and may be adjacent to the body structure 120 at a lower edge of each of the first side window 112 and the second side window 114. The first side window 112 and the second side window 114 may both be mounted for retraction at least partially into the body structure 120 in a conventional manner. Additional side windows may be positioned rearward of the B-pillars 104 and extend to the C-pillars 106.

The vehicle 100 includes a sliding panel 130, which may also be referred to as a sunroof. The sliding panel 130 is moveable with respect to other portions of the vehicle 100 in order to admit light and air into the interior of the vehicle 100. The sliding panel 130 is positioned in the roof area of the vehicle 100 and may define a portion of the roof of the vehicle 100. In a closed position (FIGS. 1-2), the sliding panel 130 completely occupies and obstructs an opening 122 that is defined rearward of windshield 116 and the front header 108 and frontward of the fixed roof panel 110. The opening 122 is positioned rearward of the front header 108 toward the fixed roof panel 110 and functions to admit light and air into the interior of the vehicle when it is not obstructed. The opening 122 is also positioned laterally between the first side window 112 and the second side window 114.

Figure 1:
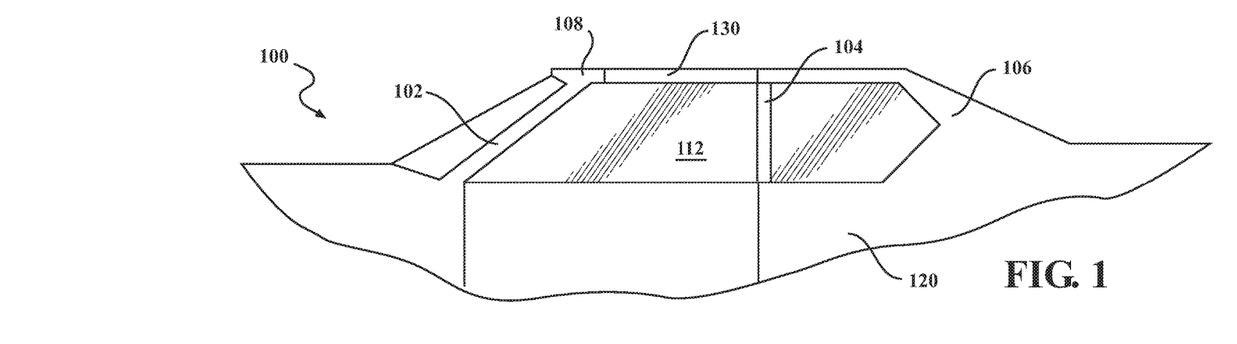
FIG. 1 is a side view showing a vehicle with a sliding panel in a closed position.
Figure 2:
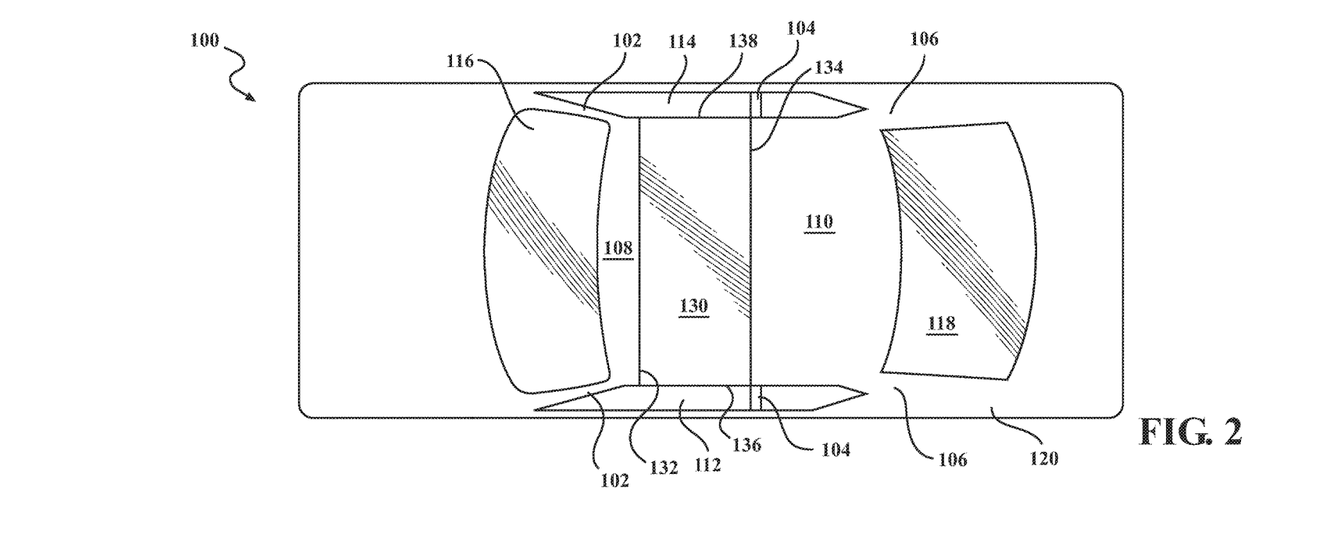
FIG. 2 is a top view showing the vehicle with the sliding panel in the closed position.
Figure 3:
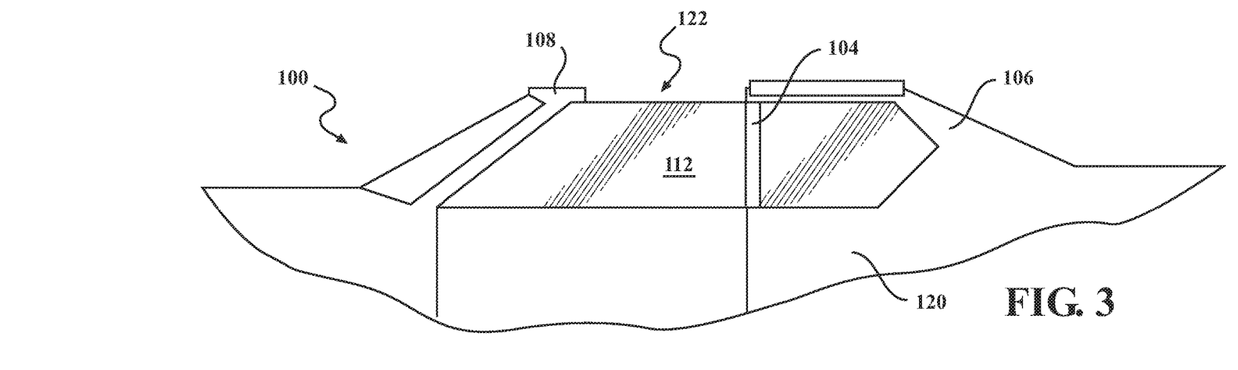
FIG. 3 is a side view showing the vehicle with the sliding panel in an open position.
Figure 4:
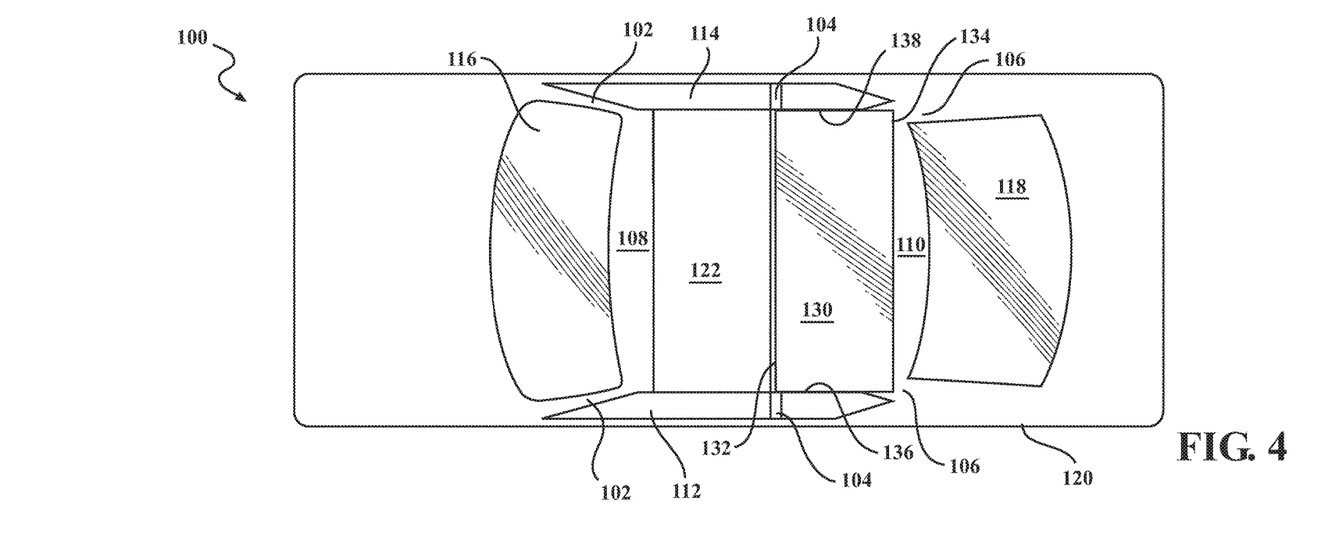
FIG. 4 is a side view showing the vehicle with the sliding panel in the open position.

The sliding panel 130 has a front transverse edge 132 that extends in the transverse direction of the vehicle 100 and is adjacent to the front header 108 or the windshield 116 in the closed position. The sliding panel 130 has a rear transverse edge 134 that extends in the transverse direction of the vehicle 100 and is adjacent to the fixed roof panel 110 in the closed position. The sliding panel 130 has a first lateral edge 136 that extends in the longitudinal direction of the vehicle 100 and is adjacent to the first side window 112 in the closed position. The sliding panel 130 has a second lateral edge 138 that extends in the longitudinal direction of the vehicle 100 and is adjacent to the second side window 114 in the closed position.

From the closed position, the sliding panel 130 is rotated slightly (e.g. five degrees), to a tilted position (not shown), in which a rear edge of the sliding panel 130 is raised slightly upward away from the opening 122 to allow airflow from the exterior of the vehicle through the opening 122. Movement of the sliding panel 130 from the closed position to the tilted position may include a slight upward or rearward movement of the sliding panel 130 in addition to rotation.

In an open position (FIGS. 3-4), the sliding panel is moved slightly upward, the sliding panel 130 may be rotated slightly such that the rear edge of the sliding panel 130 is higher than a front edge of the sliding panel 130, and the sliding panel 130 is moved longitudinally rearward (i.e. toward the rear of the vehicle 100 in a front-to-rear-direction of the vehicle 100). Thus, in the open position, the sliding panel 130 is positioned at the exterior of the vehicle 100 adjacent to and directly above the fixed roof panel 110. The distance by which the sliding panel 130 is moved is sufficient to position a majority of the sliding panel 130 above the fixed roof panel 110 such that the opening is not obstructed (e.g. a majority of the opening 122 does not have the sliding panel 130 positioned directly above it. The front edge of the sliding panel 130 may be positioned above the opening 122.

Figure 5:
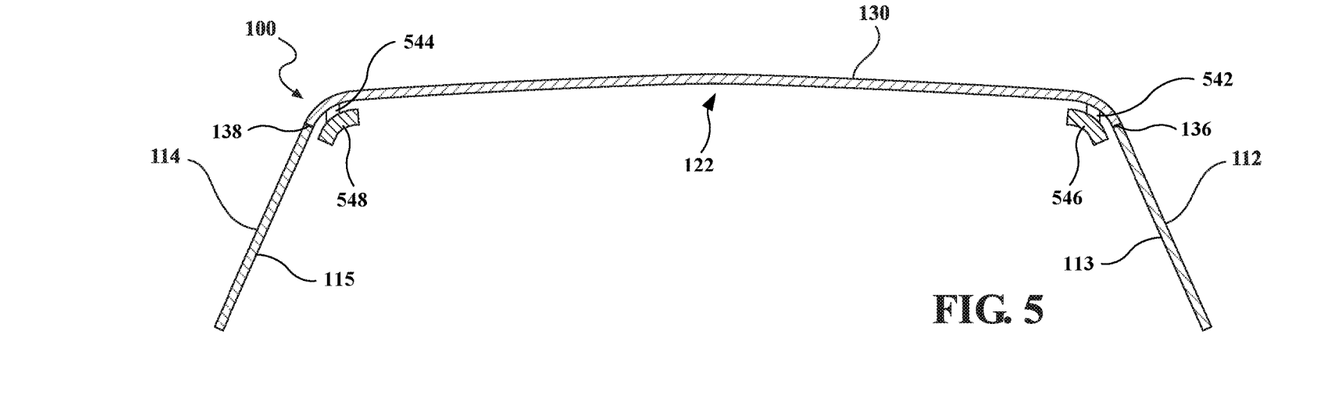
FIG. 5 is a front cross-section view showing the vehicle with the sliding panel in the closed position.
Figure 6:
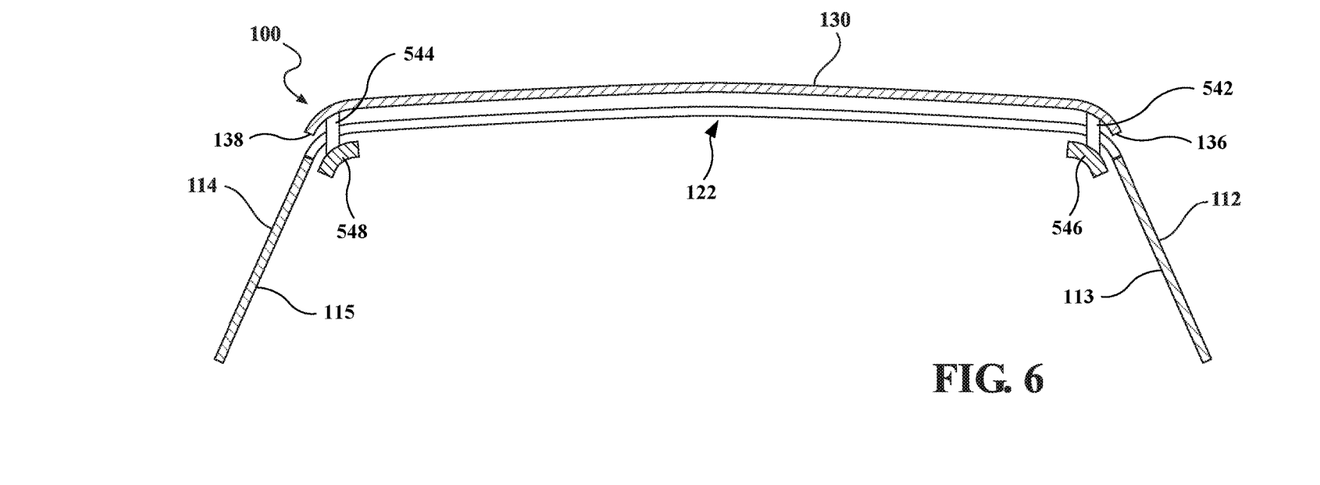
FIG. 6 is a front cross-section view showing the vehicle with the sliding panel in the open position.

FIGS. 5-6 show an extension assembly that supports the sliding panel 130 for sliding motion between the closed and open positions. The extension assembly has a first extension mechanism 542 and a second extension mechanism 544 that are incorporated in the vehicle 100 to move the sliding panel 130 between the closed position (FIG. 5) and an open position (FIG. 6). The extension assembly is connected to the sliding panel 130 and is also connected to a body structure or frame structure of the vehicle 100, in order to cause motion of the sliding panel 130 with respect to other parts of the vehicle 100.

In the illustrated implementation, the extension assembly is connected to a first longitudinal beam 546 and a second longitudinal beam 548. The first longitudinal beam 546 is a first structural member of the vehicle 100 that is disposed adjacent to an interior surface 540 of the sliding panel 130 and an interior surface 113 of the first side window 112. The second longitudinal beam 548 is a second structural member of the vehicle 100 that is disposed adjacent to the interior surface 540 of the sliding panel 130 and an interior surface 115 of the second side window 114. The first longitudinal beam 546 and the second longitudinal beam 548 each extend in the longitudinal or front-to-rear direction of the vehicle 100.

The first extension mechanism 542 connects the first longitudinal beam 546 to the sliding panel 130 and the second extension mechanism 544 that connects the second longitudinal beam 548 to the sliding panel 130. The first and second extension mechanisms 542, 544 may be connected to the sliding panel 130 by structures such as fasteners or adhesives. The first and second extension mechanisms 542, 544 function to move the sliding panel 130 between the closed and open positions, and optionally, to the tilted position. Any suitable mechanisms for this purpose may be used as the first and second extension mechanisms 542, 544. As one example, the first and second extension mechanisms 542, 544 may including telescoping rods that are pivotally mounted to the first and second longitudinal beams 546, 548, and to the sliding panel 130. As another example, the first and second extension mechanisms 542, 544 may include interconnected pairs of sliding tracks that are mounted to the first and second longitudinal beams 546, 548, and to the sliding panel 130.

As can be seen in FIGS. 5-6, the opening 122 extends from the first side window 112 to the second side window 114. The sliding panel 130 obstructs the opening 122 in the closed position, with the first lateral edge 136 of the sliding panel 130 being positioned directly adjacent to the first side window 112 and with the second lateral edge 138 of the sliding panel 130 being positioned directly adjacent to the second side window 114 in the closed position. By moving the sliding panel 130 upward and rearward out of the opening 122 from the closed position to the open position using the extension assembly, at least part of the opening 122 is unobstructed in the open position.

Figure 7:
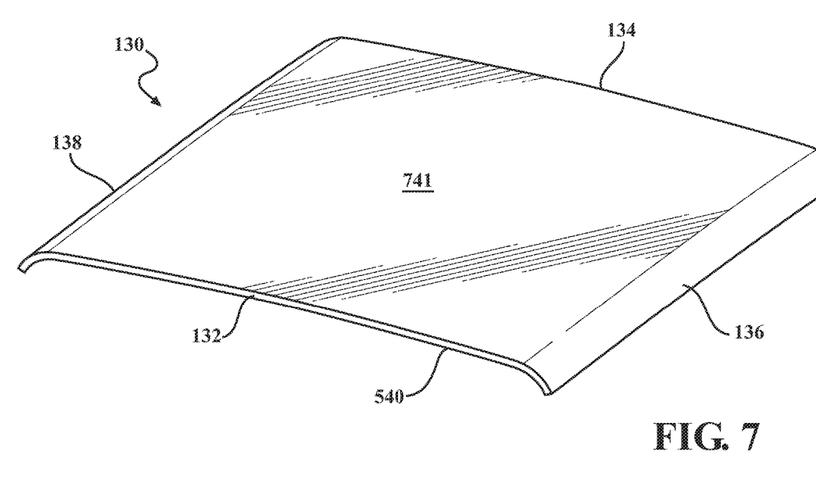
FIG. 7 is a perspective view showing the sliding panel according to a first implementation.

As best seen in FIG. 7, the sliding panel 130, which is configured according to a first implementation of this disclosure, is a relatively thin panel with a generally rectangular shape. The sliding panel 130 may have a uniform thickness throughout or may include variations in its thickness. Although the sliding panel 130 may be curved throughout, it is generally flat in the side-to-side direction near its lateral middle between the first lateral edge 136 and the second lateral edge 138. Near the first lateral edge 136 and the second lateral edge 138, the sliding panel 130 may curve downward in the side-to-side direction, so that the angle of an exterior surface 741 of the sliding panel 130 approximates the angles formed at the top edges of the first side window 112 and the second side window 114 such that a smooth transition and continuous shape is defined where the sliding panel 130 meets the first and second side windows 112, 114.

The sliding panel 130 may be formed entirely or primarily from a material that is at least translucent. The phrase "at least translucent," as used herein, means that the material is at least one of translucent or transparent as viewed from one or both sides of the material, such that the material allows light (i.e. visible wavelengths of electromagnetic radiation) to pass through it, and includes materials that are perfectly transparent. As one example, the sliding panel 130 may be formed from glass. As another example, the sliding panel 130 may be formed from plastic such as acrylic.

The sliding panel 130 is at least translucent at and adjacent to the front transverse edge 132. Moreover, the sliding panel 130 may be free from non-translucent elements that are attached to or incorporated in the sliding panel 130 at and adjacent to the front transverse edge 132. Therefore, light is able to pass through the sliding panel 130 in the area at and adjacent to the front transverse edge 132. Because this portion of the sliding panel 130 may be disposed directly above the opening 122 when the sliding panel 130 is in the open position, allowing light to pass through this portion of the sliding panel 130 increases the amount of light admitted into the interior of the vehicle 100 when the sliding panel 130 is in the open position.

Figure 8:
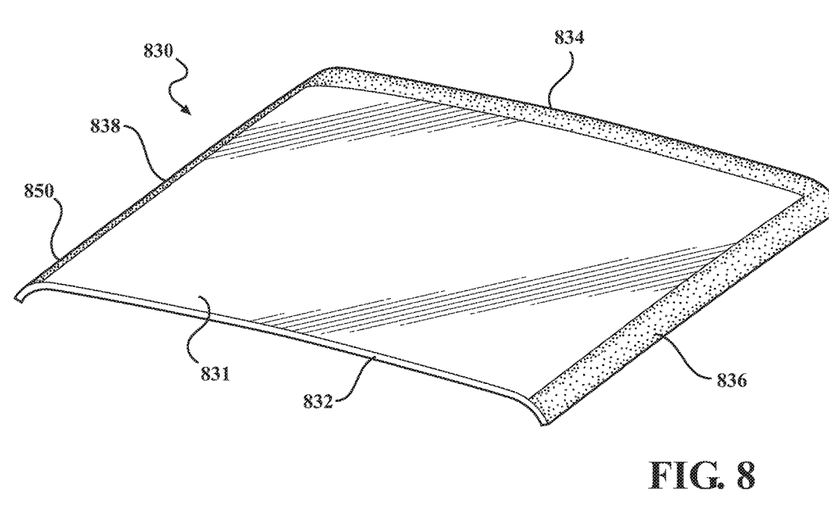
FIG. 8 is a perspective view showing a sliding panel according to a second implementation.

FIG. 8 shows a sliding panel 830 according to a second implementation. The sliding panel 830 may be incorporated in the vehicle 100 in place of the sliding panel 130. The sliding panel 830 is similar to the sliding panel 130 except for the incorporation of a frame 850 that is u-shaped and is disposed adjacent to a rear transverse edge 834, a first lateral edge 836, and a second lateral edge 838, but adjacent to none of or only part of a front transverse edge 832. The frame 850 is located relative to the sliding panel 830 such that it extends outward from each of the first lateral edge 836, the second lateral edge 838, and rear transverse edge 834. Thus, the frame 850 is not present adjacent to the front transverse edge 832 near a lateral middle of the sliding panel 830. Top and bottom surfaces of the frame 850 may be elevationally aligned with top and bottom surfaces of the sliding panel 830.

The frame 850 is connected to a panel portion 831. At least part of the panel portion 831 is at least translucent. In particular, the panel portion 831 is at least translucent at and adjacent to a front transverse edge 832 of the sliding panel 830. In some implementations, all of the panel portion 831 is at least translucent.

The frame 850 is disposed outward from the panel portion 831, may be bonded to the edges of the panel portion, and may be of a thickness similar to that of the panel portion. The frame 850 may be made of a material that is different than the material from which the panel portion 831 is made, such as a stronger material. The frame 850 may be at least translucent, or the frame 850 may be opaque.

Figure 9:
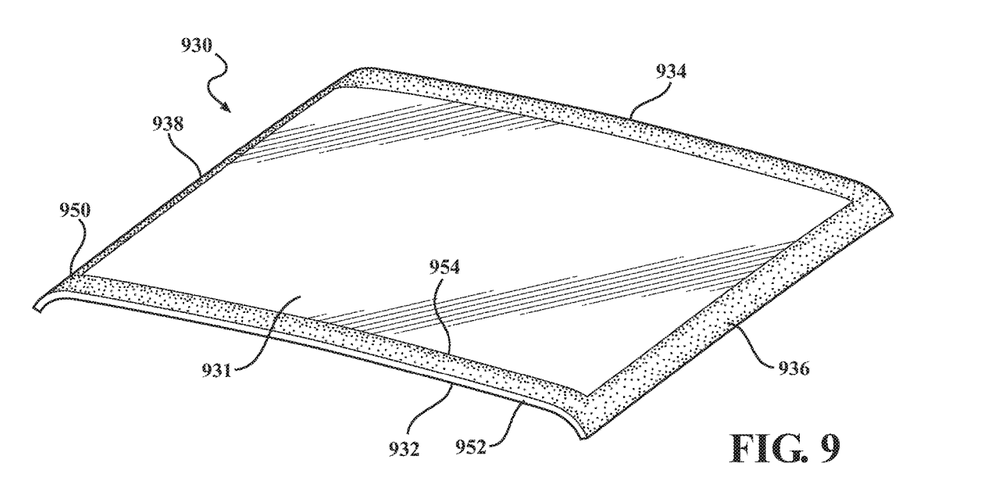
FIG. 9 is a perspective view showing a sliding panel according to a third implementation.

FIG. 9 shows a sliding panel 930 according to a third implementation. The sliding panel 930 may be incorporated in the vehicle 100 in place of the sliding panel 130. The sliding panel 930 is similar to the sliding panel 830 except that a frame 950 is rectangular instead of u-shaped. The frame 950 has an outer periphery 952 adjacent to a front transverse edge 932, rear transverse edge 934, a first lateral edge 936, and a second lateral edge 938 of the sliding panel 930. The frame 950 has an inner periphery 954 that surrounds an opening formed through the frame 950. The inner periphery 954 is connected to a panel portion 931 that is similar to the panel portion 831 and to the sliding panel 130. The frame 950 is formed in whole or in part of a material that is at least translucent to allow light to pass through the frame 950 at and adjacent to the front transverse edge 932 of the sliding panel 930.

Figure 10:
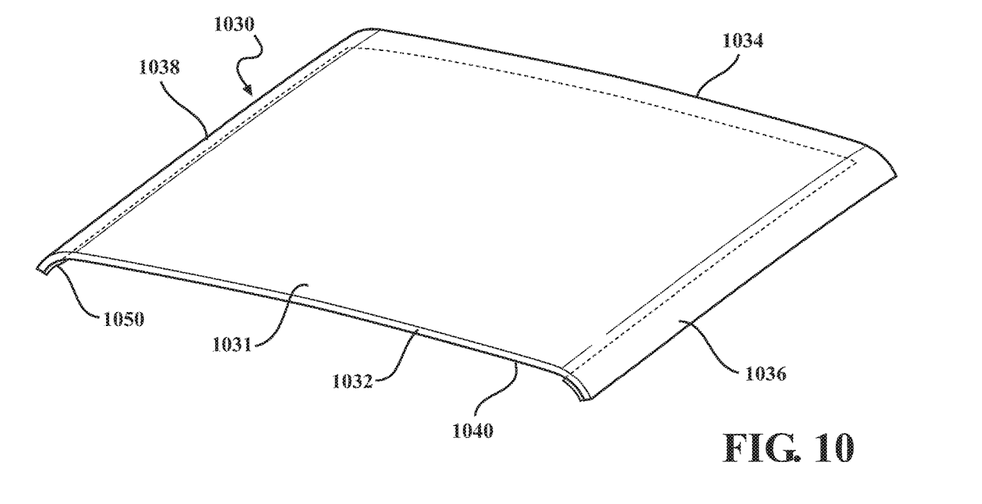
FIG. 10 is a perspective view showing a sliding panel according to a fourth implementation.

FIG. 10 shows a sliding panel 1030 according to a fourth implementation. The sliding panel 1030 may be incorporated in the vehicle 100 in place of the sliding panel 130. The sliding panel 1030 is similar to the sliding panel 130 except for the incorporation of a frame 1050 that is u-shaped and is disposed adjacent to a rear transverse edge 1034, a first lateral edge 1036, and a second lateral edge 1038, but adjacent to none of or only part of a front transverse edge 1032. Thus, the frame 1050 is not present adjacent to the front transverse edge 1032 near a lateral middle of the sliding panel 1030.

The frame 1050 is connected to a panel portion 1031. At least part of the panel portion 1031 is at least translucent. In particular, the panel portion 1031 is at least translucent at and adjacent to a front transverse edge 1032 of the sliding panel 1030. In some implementations, all of the panel portion 1031 is at least translucent. The panel portion 1031 extends outward to the full extents of the sliding panel 1030, including to the front transverse edge 1032, the rear transverse edge 1034, the first lateral edge 1036, and the second lateral edge 1038.

The frame 1050 is disposed below the panel portion 1031 and may be connected to an interior surface 1040 of the sliding panel 1030, such as by fasteners or an adhesive. A translucent or transparent adhesive may be used to preserve translucency or transparency of the frame 1050 is translucent or transparent. The frame 1050 may be made of a material that is different than the material from which the panel portion 1031 is made, such as a stronger material. The frame 1050 may be at least translucent, or the frame 1050 may be opaque.

Figure 11:
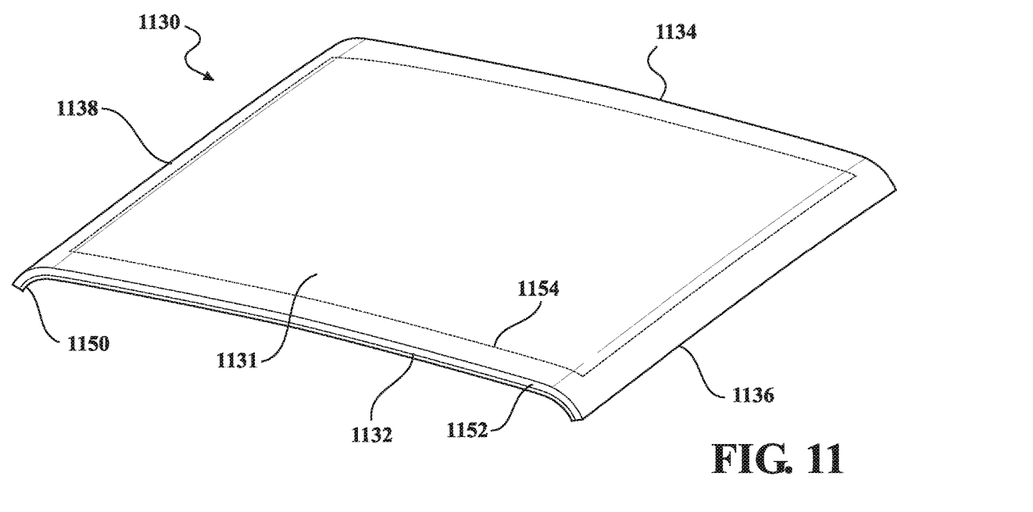
FIG. 11 is a perspective view showing a sliding panel according to a fifth implementation.

FIG. 11 shows a sliding panel 1130 according to a fifth implementation. The sliding panel 1130 may be incorporated in the vehicle 100 in place of the sliding panel 130. The sliding panel 1130 is similar to the sliding panel 1030 except that a frame 1150 is rectangular instead of u-shaped. The frame 1150 has an outer periphery 1152 adjacent to a front transverse edge 1132, rear transverse edge 1134, a first lateral edge 1136, and a second lateral edge 1138 of the sliding panel 1130. The frame 1150 has an inner periphery 1154 that surrounds an opening formed through the frame 1150.

The frame 1150 is connected to a panel portion 1131. At least part of the panel portion 1131 is at least translucent. In particular, the panel portion 1131 is at least translucent at and adjacent to a front transverse edge 1132 of the sliding panel 1130. In some implementations, all of the panel portion 1131 is at least translucent. The panel portion 1131 extends outward to the full extents of the sliding panel 1130, including to the front transverse edge 1132, the rear transverse edge 1134, the first lateral edge 1136, and the second lateral edge 1138.

The frame 1150 is disposed below the panel portion 1131 and may be connected to an interior surface 1140 of the sliding panel 1130, such as by fasteners or an adhesive. The frame 1150 may be made of a material that is different than the material from which the panel portion 1131 is made, such as a stronger material.

Figure 12:
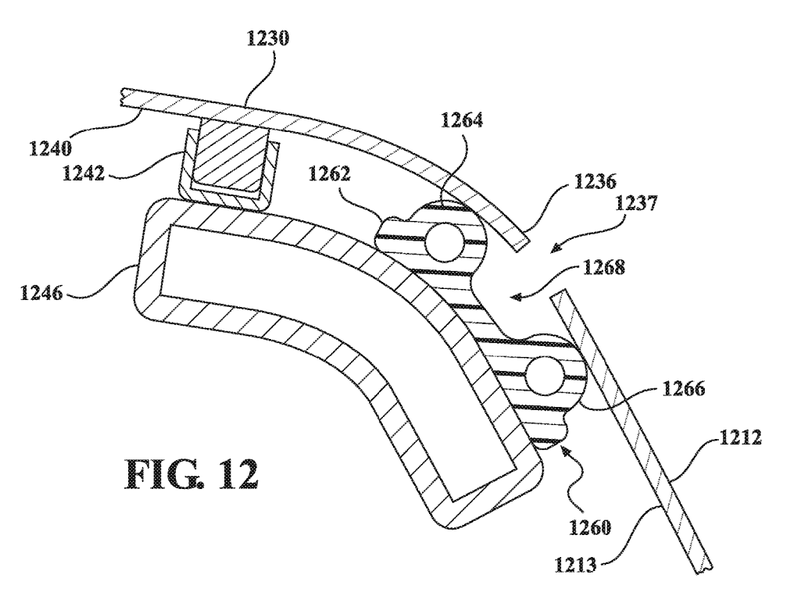
FIG. 12 is a front cross section view showing the sliding panel, a first side window, and a sealing member according to a sixth implementation.

FIG. 12 shows a sealing member 1260 according a sixth implementation. The sealing member 1260 can be incorporated in the vehicle 100. A first side window 1212, a sliding panel 1230, a first extension mechanism 1242 and a first longitudinal beam 1246 may be similar to the first side window 112, the sliding panel 130, the first extension mechanism 542 and the first longitudinal beam 546.

The first side window 1212 is separated from a first lateral edge 1236 of the sliding panel 1230 by a gap 1237. Although not illustrated, it should be understood that the same structures are present on an opposite side of the vehicle, and thus a second side window is separated from a second lateral edge of the sliding panel 1230 by a gap in the same manner. The gap 1237 may be an "air gap" that is free from vehicle structures such that only empty space is present in the gap 1237.

The sealing member 1260 is formed from a resilient material of any suitable type such as those previously used to make automotive door and widow seals. The sealing member 1260 extends along the first longitudinal beam 1246 and may be connected to the first longitudinal beam 1246 by features that are captured in corresponding features of the first longitudinal beam 1246, or by adhesives.

The sealing member 1260 is able to sealingly engage the sliding panel 1230 and the first side window 1212. In particular, the sealing member 1260 engages an interior surface 1240 of the sliding panel 1230 and an interior surface 1213 of the first side window. The sealing member 1260 may include a base portion 1262 that is connected to the first longitudinal beam 1246, a first sealing portion 1264 that extends upward from the base portion 1262 and engages the interior surface 1240 of the sliding panel 1230 in the closed position, and a second sealing portion 1266 that extends upward from the base portion 1262 and engages the interior surface 1213 of the first side window 1212 in the closed position. The first sealing portion 1264 and the second sealing portions 1266 are elongate structures that extend along the length of the sealing member 1260 and may define a double-hump configuration for the sealing member 1260 with a depression 1268 between the first sealing portion 1264 and the second sealing portion 1266. Thus, the first sealing portion 1264 and the second sealing portion 1266 each extend along the gap 1237, on opposite sides of the gap 1237.

A second sealing member similar to the sealing member 1260 may be present on an opposite side of the vehicle.

Figure 13:
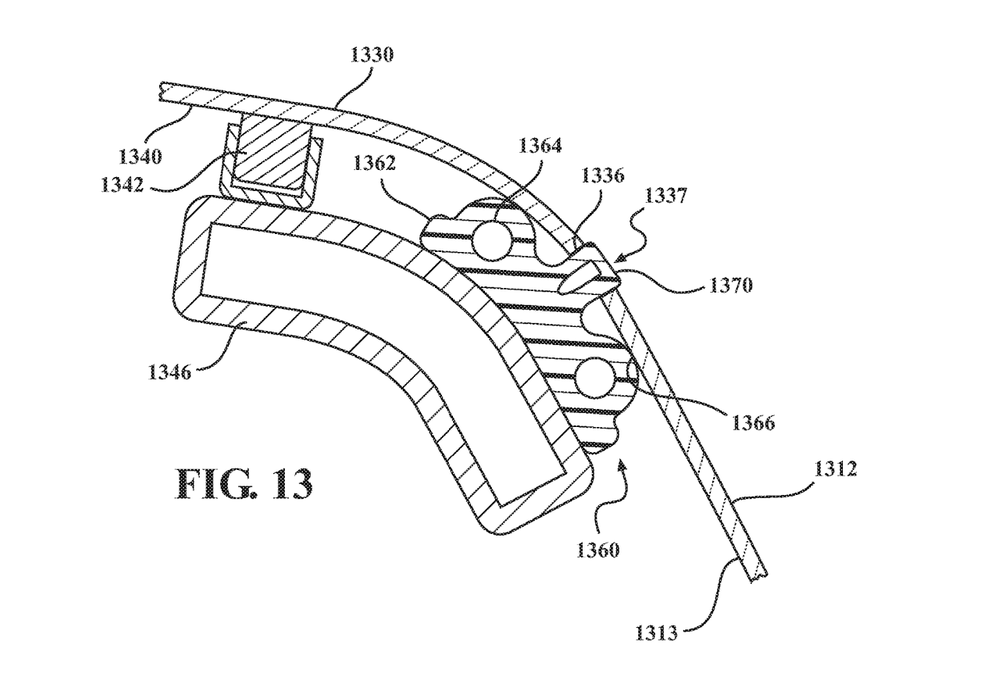
FIG. 13 is a front cross-section view showing the sliding panel, the first side window, and a sealing member according to a seventh implementation.

FIG. 13 shows a sealing member 1360 according a sixth implementation. The sealing member 1360 can be incorporated in the vehicle 100. A first side window 1312, a sliding panel 1330, a first extension mechanism 1342 and a first longitudinal beam 1346 may be similar to the first side window 112, the sliding panel 130, the first extension mechanism 542 and the first longitudinal beam 546.

The first side window 1312 is separated from a first lateral edge 1336 of the sliding panel 1330 by a gap 1337. Although not illustrated, it should be understood that the same structures are present on an opposite side of the vehicle, and thus a second side window is separated from a second lateral edge of the sliding panel 1330 by a gap in the same manner.

The sealing member 1360 is formed from a resilient material of any suitable type such as those previously used to make automotive door and widow seals. The sealing member 1360 extends along the first longitudinal beam 1346 and may be connected to the first longitudinal beam 1346 by features that are captured in corresponding features of the first longitudinal beam 1346, or by adhesives.

The sealing member 1360 is able to sealingly engage the sliding panel 1330 and the first side window 1312. In particular, the sealing member 1360 engages an interior surface 1340 of the sliding panel 1330 and an interior surface 1313 of the first side window. The sealing member 1360 may include a base portion 1362 that is connected to the first longitudinal beam 1346, a first sealing portion 1364 that extends upward from the base portion 1362 and engages the interior surface 1340 of the sliding panel 1330 in the closed position, and a second sealing portion 1366 that extends upward from the base portion 1362 and engages the interior surface 1313 of the first side window 1312 in the closed position. The first sealing portion 1364 and the second sealing portions 1366 are elongate structures that extend along the length of the sealing member 1360. The first sealing portion 13164 and the second sealing portion 1366 each extend along the gap 1337, on opposite sides of the gap 1337.

Between the first sealing portion 1364 and the second sealing portion 1366, the sealing member 1360 includes a central ridge 1370 that is an elongate member that extends along the length of the sealing member 1360. When the sliding panel 1330 is closed, the central ridge 1370 is disposed within the gap 1337. Thus, at least a portion, namely such as the central ridge 1370, of the sealing member 1360 is positionable between the sliding panel 1330 and the first side window 1312 in the gap 1337, and is therefore positioned in the gap 1337 when the sliding panel 1330 is in the closed position.

A second sealing member similar to the sealing member 1360 may be present on an opposite side of the vehicle.

Figure 14:
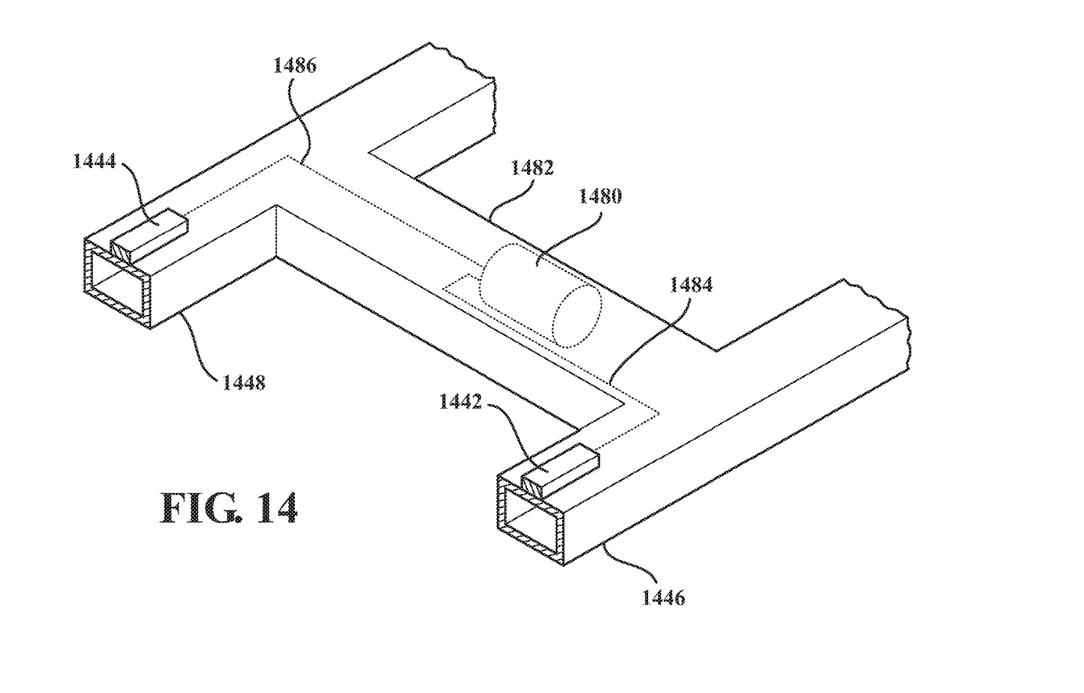
FIG. 14 is a perspective view showing an actuator and an extension assembly.

FIG. 14 is a perspective view showing an actuator 1480 and an extension assembly that can be incorporated in the vehicle 100.

The extension assembly includes a first extension mechanism 1442 and a second extension mechanism 1444 that support a sliding panel (not shown in FIG. 14) for sliding motion between the closed and open positions. The first and second extension mechanisms are similar to the first and second extension mechanisms 542, 544. The first and second extension mechanisms 1442, 1444 are disposed on first and second longitudinal beams 1446, 1448 that are similar to the first and second longitudinal beams 546, 548.

The first and second longitudinal beams 1446, 1448 are connected to one another by a cross beam 1482 that extends in the transverse or cross-car direction. The first and second longitudinal beams 1446, 1448 and the cross beam 1482 are at least partially hollow. The actuator 1480 is disposed within a hollow interior of the cross beam 1482. The actuator is operatively connected to the first extension mechanism 1442 and the second extension mechanism 1444 by first and second connecting portions 1484, 1486 that connect the actuator 1480 to the first and second extension mechanisms 1442, 1444, and are disposed in the hollow interiors of the first and second longitudinal beams 1446, 1448 and the cross beam 1482. Operation of the actuator 1480 causes extension or retraction of the first and second extension mechanisms 1442, 1444 to move the sliding panel between the closed and open positions.

As an example, the actuator 1480 can include an electric motor and a pulley that is rotated by the electric motor, and the connecting portions 1484, 1486 can be mechanical cables. Other types of structures can be used as the actuator 1480 and the control portions. Also, as an alternative to a single actuator, a separate actuator can be associated with each of the first and second extension mechanisms 1442, 1444, and these actuators can be disposed within the cross beam 1482 or respective ones of the first and second longitudinal beams 1446, 1448.

What is claimed is:

1. A vehicle, comprising:
a windshield;
an opening that is located rearward of the windshield; and
a sliding panel that has a panel portion and a frame portion, the frame portion is connected to the panel portion, the sliding panel obstructs the opening in a closed position and is moveable to an open position in which at least part of the opening is unobstructed, and the sliding panel is at least one of translucent or transparent,
wherein the frame portion does not block visibility through the sliding panel adjacent to a front transverse edge of the panel portion,
wherein the frame portion is formed from a material that is at least one of translucent or transparent, and
wherein the frame portion is connected to an interior surface of the sliding panel by an adhesive that is at least one of translucent or transparent.

2. A vehicle, comprising:
a windshield;
an opening that is located rearward of the windshield; and
a sliding panel that has a panel portion and a frame portion, the frame portion is connected to the panel portion, the sliding panel obstructs the opening in a closed position and is moveable to an open position in which at least part of the opening is unobstructed, and the sliding panel is at least one of translucent or transparent, wherein the frame portion does not block visibility through the sliding panel adjacent to a front transverse edge of the panel portion, wherein the frame portion is U-shaped, the frame portion is positioned adjacent to a first lateral edge of the panel portion, the frame portion is positioned adjacent to a rear transverse edge of the panel portion, and the frame portion is positioned adjacent to a second lateral edge of the panel portion.

3. The vehicle of claim 1, wherein the frame portion is positioned below the panel portion.

4. A vehicle, comprising:
a windshield;
an opening that is located rearward of the windshield; and
a sliding panel that has a panel portion and a frame portion, the frame portion is connected to the panel portion, the sliding panel obstructs the opening in a closed position and is moveable to an open position in which at least part of the opening is unobstructed, and the sliding panel is at least one of translucent or transparent, wherein the frame portion does not block visibility through the sliding panel adjacent to a front transverse edge of the panel portion, wherein the frame portion is positioned outward from each of a first lateral edge of the panel portion, a second lateral edge of the panel portion, and a rear transverse edge of the panel portion.

5. A vehicle, comprising:
a windshield;
an opening that is located rearward of the windshield;
a first side window;
a second side window; and
a sliding panel that has a panel portion and a frame portion, the frame portion is connected to the panel portion, the sliding panel obstructs the opening in a closed position and is moveable to an open position in which at least part of the opening is unobstructed, and the sliding panel is at least one of translucent or transparent, wherein the frame portion does not block visibility through the sliding panel adjacent to a front transverse edge of the panel, wherein the opening extends from the first side window to the second side window, a first lateral edge of the panel portion is adjacent to the first side window, and a second lateral edge of the panel portion is adjacent to the second side window.

6. The vehicle of claim 1, further comprising:
an exterior surface, wherein the sliding panel is positioned adjacent to the exterior surface in the open position;
a first structural member that is disposed adjacent to an interior surface of the panel portion of the sliding panel;
a second structural member that is disposed adjacent to the interior surface of the panel portion of the sliding panel;
an extension assembly that supports the sliding panel for sliding motion between the closed position and the open position, wherein the extension assembly is supported by the first structural member and the second structural member; and
an actuator for causing motion of the sliding panel between the closed position and the open position using the extension assembly.

7. A vehicle, comprising:
a windshield;
an opening that is located rearward of the windshield;
a panel that has a front transverse edge, wherein the panel is at least one of translucent or transparent;
an extension assembly that is connected to the panel for moving the panel between a closed position and an open position, wherein the front transverse edge of the panel is located adjacent to the windshield in the closed position; and
a frame that is connected to an interior surface of the panel, wherein the frame is at least one of translucent or transparent and the extension assembly is connected to the panel by the frame.

8. The vehicle of claim 7, further comprising:
an exterior surface, wherein the panel is positioned adjacent to the exterior surface in the open position.

9. The vehicle of claim 7, wherein the frame does not block visibility through the panel adjacent to a front transverse edge of the panel.

10. The vehicle of claim 9, wherein the frame is U-shaped and is positioned adjacent to a first lateral edge of the panel, a rear transverse edge of the panel, and a second lateral edge of the panel.

11. A vehicle, comprising:
a first side window;
a second side window;
an opening that extends from the first side window to the second side window; and
a sliding panel that obstructs the opening in a closed position and is moveable to an open position in which at least part of the opening is unobstructed, wherein the sliding panel is formed from a material that is at least one of translucent or transparent.

12. The vehicle of claim 11, wherein the first side window is separated from a first lateral edge of the sliding panel by a first gap and the second side window is separated from a second lateral edge of the sliding panel by a second gap.

13. The vehicle of claim 12, wherein the first gap and the second gap are air gaps that are free from vehicle structures.

14. The vehicle of claim 12, wherein a first sealing member is positioned in the first gap and a second sealing member is positioned in the second gap.

15. The vehicle of claim 11, further comprising
a first structural member that is disposed adjacent to an interior surface of the sliding panel and an interior surface of the first side window;
a second structural member that is disposed adjacent to the interior surface of the sliding panel and an interior surface of the second side window;
a first sealing member disposed on the first structural member, wherein the first sealing member is able to sealingly engage the sliding panel and the first side window; and
a second sealing member disposed on the second structural member wherein the second sealing member is able to sealingly engage the sliding panel and the second side window.

16. The vehicle of claim 15, wherein at least a portion of the first sealing member is positionable between the sliding panel and the first side window and at least a portion of the second sealing member is positionable between the sliding panel and the second side window.

17. The vehicle of claim 7, wherein the frame is connected to the interior surface of the panel by an adhesive, and the adhesive is at least one of translucent or transparent.

\* \* \* \* \*